US012696371B2

(12) United States Patent
Lapcik et al.

(10) Patent No.: US 12,696,371 B2
(45) Date of Patent: Jul. 28, 2026

(54) ASSEMBLY FOR A PLASMA ARC TORCH AND METHOD OF OPERATION OF THE ASSEMBLY FOR A PLASMA ARC TORCH

(71) Applicant: Thermacut, k.s., Uherske Hradiste (CZ)

(72) Inventors: Zdenek Lapcik, Modra (CZ); Tomas Kusak, Polesovice (CZ)

(73) Assignee: Thermacut, k.s., Uherske Hradiste (CZ)

( * ) Notice: Subject to any disclaimer, the term of this patent is extended or adjusted under 35 U.S.C. 154(b) by 723 days.

(21) Appl. No.: 18/026,188

(22) PCT Filed: Sep. 9, 2021

(86) PCT No.: PCT/CZ2021/050096

§ 371 (c)(1),
(2) Date: Mar. 14, 2023

(87) PCT Pub. No.: WO2022/057959

PCT Pub. Date: Mar. 24, 2022

(65) Prior Publication Data

US 2023/0363077 A1 Nov. 9, 2023

(30) Foreign Application Priority Data

Sep. 15, 2020 (CZ) ................................ CZ2020-513

(51) Int. Cl.
*H05H 1/34* (2006.01)

(52) U.S. Cl.
CPC ........ *H05H 1/3489* (2021.05); *H05H 1/3421* (2021.05); *H05H 1/3473* (2021.05)

(58) Field of Classification Search
None
See application file for complete search history.

(56) References Cited

U.S. PATENT DOCUMENTS

| | | | |
|---|---|---|---|
| 8,115,136 | B2 | 2/2012 | Mather et al. |
| 2002/0117483 | A1 | 8/2002 | Jones et al. |

(Continued)

FOREIGN PATENT DOCUMENTS

| | | | |
|---|---|---|---|
| CN | 107442914 | A | 12/2017 |
| CN | 111590175 | A | 8/2020 |

(Continued)

OTHER PUBLICATIONS

Search Report from the Czech Republic from Application No. PV 2020-513, dated Feb. 26, 2021.

(Continued)

*Primary Examiner* — Elizabeth M Kerr
(74) *Attorney, Agent, or Firm* — Warner Norcross + Judd LLP

(57) ABSTRACT

Assembly for a plasma arc torch comprising: —an electrical contact element (6), having a proximal contact surface (25) for contact with a power supply component (8) and a cavity with inner side walls for contact with side walls of a proximal end portion (14) of an electrode (3), and —a spring (4) for pushing the electrode (3) away from the electrical contact element (6), and —an insulation element (5) arranged on the electrical contact element (6) and adapted to prevent transfer of electrical current form the electrical contact element (6) to the spring (4).

10 Claims, 4 Drawing Sheets

(56) References Cited

U.S. PATENT DOCUMENTS

| | | | | |
|---|---|---|---|---|
| 2004/0173582 | A1 | 9/2004 | Homer-Richardson et al. | |
| 2007/0210034 | A1 | 9/2007 | Mather et al. | |
| 2011/0240608 | A1 | 10/2011 | Merrill et al. | |
| 2012/0001812 | A1 | 1/2012 | Zhoa et al. | |
| 2012/0031881 | A1 | 2/2012 | Griffin | |
| 2012/0181257 | A1* | 7/2012 | Mather | H05H 1/34<br>219/121.36 |
| 2013/0126487 | A1 | 5/2013 | Crowe | |
| 2016/0165712 | A1* | 6/2016 | Zhang | H05H 1/34<br>219/121.52 |

FOREIGN PATENT DOCUMENTS

| | | | |
|---|---|---|---|
| JP | H03106572 | A | 5/1991 |
| WO | 2012021236 | A1 | 2/2012 |

OTHER PUBLICATIONS

International Search Report from Application No. PCT/CZ2021/050096, dated Nov. 23, 2021.

* cited by examiner

ASSEMBLY FOR A PLASMA ARC TORCH AND METHOD OF OPERATION OF THE ASSEMBLY FOR A PLASMA ARC TORCH

FIELD OF THE INVENTION

The present invention relates to an assembly for a contact start plasma arc torch, the assembly including an electric contact element for conducting electric current from a power supply element to an electrode, and a spring for pushing the electrode in the direction away from the supply element. The invention also relates to a method of operation of the assembly for a plasma arc torch.

BACKGROUND OF THE INVENTION

Plasma arc torches with a movable electrode, which is biased towards frontal position by means of a spring, wherein distal end of the electrode is in contact with the nozzle, are known in the art. Electric current is applied to the electrode, after which the electrode moves to its rear position by an action of plasma gas introduced into the plasma chamber, so that a pilot arc is formed between the electrode and the nozzle. Subsequently, the pilot arc is transferred from the nozzle to the workpiece to be processed.

In these known solutions, there is a problem of securing transfer of electric current from the power source to the electrode when the electrode is in the frontal position and particularly during its movement from the frontal position to the rear position.

For example, Czech patent no. 304595 discloses an assembly, wherein the transfer is carried out using a contact element arranged on the spring for pushing the electrode to the frontal position, wherein the electric current passes through the spring and the contact element or through an inserted conductor in the form of a wire during the movement from the frontal position to the rear position.

In EP3152984 the spring for pushing the electrode to the frontal position is fixed in such a way that it creates a torque during the passage to the rear position, wherein the torque makes the lateral surface of the contact element push towards the lateral surface of the electrode, which ensures a contact between them even during the movement from the frontal position to the rear position.

The disadvantage of these devices is stress of the spring caused by the passage of high current needed for the plasma arc, wherein the spring can be damaged and degraded, which can manifest by corrosion or tempering.

SUMMARY OF THE INVENTION

The above disadvantages of prior art torches are eliminated by means of an assembly for a plasma arc torch comprising:

- an electrical contact element, having a proximal contact surface for contact with a power supply component and a cavity with inner side walls for contact with side walls of a proximal end portion of an electrode, and
- a spring for pushing the electrode away from the electrical contact element, and
- an insulation element arranged on the electrical contact element and adapted to prevent transfer of electrical current form the electrical contact element to the spring.

The assembly may further comprise an electrode, wherein a proximal end portion of the electrode is insertable into the cavity of the electrical contact element, wherein side walls of the proximal end portion of the electrode are in contact with the inner side walls of the cavity of the electrical contact element during said sliding motion.

Preferably, the outer side walls of the proximal end portion of the electrode have a shape complementary to the inner side walls of the cavity of the electrical contact element, preferably the outer side walls of the proximal end portion of the electrode and the inner side walls of the cavity of the electrical contact element are cylindrical, wherein clearance between the side walls of the proximal end portion of the electrode and the inner side walls of the cavity of the electrical contact element is 0.02 to 0.1 mm.

Preferably, the spring is a coiled compression spring. The spring may be from a conductive material, e.g. from metal, or from a non-conductive material.

Preferably, the cavity within the electrical contact element has a cylindrical shape.

Preferably, the contact element has a tubular portion, which includes said cavity, wherein the insulation element forms a sleeve on the tubular portion of the contact element, and preferably, the contact element surrounds the outer walls of the cavity of the contact element.

Preferably, the insulation element has at its proximal end at least one supporting projection, which includes a supporting surface for proximal end of the spring.

According to an especially preferred embodiment, the insulation element is at its external side provided with a stop for fixing the proximal end of the spring between the stop and the supporting surface of the insulation element. The stop may be formed by an annular projection or a set of projections at the outer lateral surface of the insulation element.

Preferably, the contact element is provided with a supporting flange, against which the insulation element abuts. An embodiment, in which the contact element is tubular without a supporting flange is also feasible, wherein the proximal end of the insulation element would abut against the power supply component directly.

Such assembly is intended for a plasma arc torch, which preferably further contains

- a nozzle,
- a holder having a tubular shape, and
- a swirl ring having a tubular shape and feeding openings in its lateral wall, wherein the distal portion of the swirl ring is attached to the nozzle and the proximal portion of the swirl ring is attached to the holder, wherein the nozzle, the swirl ring and the holder are arranged coaxially and form a common cavity, in which the electrode is slidably arranged along a common axis, wherein the electrode is on its external lateral side provided with a rib, which extends helically and with clearance along the internal side of the swirl ring and/or the holder.

Preferably, the clearance between the side walls of the proximal end portion of the electrode and the side walls of the cavity of the electrical contact element is smaller than the clearance between the rib of the electrode and the internal wall of the swirl ring and the holder.

Preferably, the cavity of the contact element, the insulation element arranged thereon and the spring arranged mutually coaxially, most preferably coaxially with the torch. Preferably, the spring extends along the outer side wall of the insulation element and the insulation element extends along the outer side wall of the contact element.

The above specified disadvantages of the prior art are also eliminated by a method of operation of a plasma arc torch comprising following steps:

a) an electrode is arranged in a cavity of a plasma arc torch slidably in its axial direction, wherein the electrode is biased by means of a spring into a frontal position, in which its distal end is in contact with a nozzle, b) electric current is applied to a power supply component, the electrical current further being conducted via a contact element to the electrode, c) thereafter, gas is introduced into the cavity of the plasma arc torch, the gas pushing the electrode in its rear position against the force of the spring, wherein a pilot arc is established between the electrode and the nozzle, d) thereafter, the arc is transferred to a processed workpiece, wherein in step a) an insulation element is arranged on the contact element for preventing passage of electrical current from the contact element to the electrode via the spring, wherein the electrode is arranged such that its proximal end portion extends into the cavity of the contact element, and in the steps b) and c) the electrical current passes from the contact element via a contact between the inner side wall of the cavity of the contact element and the outer side wall of the proximal end portion of the electrode, at least until rear position of the electrode is attained.

As used herein, the expression proximal presents a portion or a surface, which is closer to the power source when considering the electrical current path (i.e. more distant from the workpiece to be processed), and the expression distal presents a portion or a surface, which is closer to the workpiece to be processed when considering the electrical current path (i.e. further from the power source).

BRIEF DESCRIPTION OF THE DRAWINGS

Exemplifying embodiments of the invention are depicted in the drawings, wherein.

DETAILED DESCRIPTION

Figure 1:
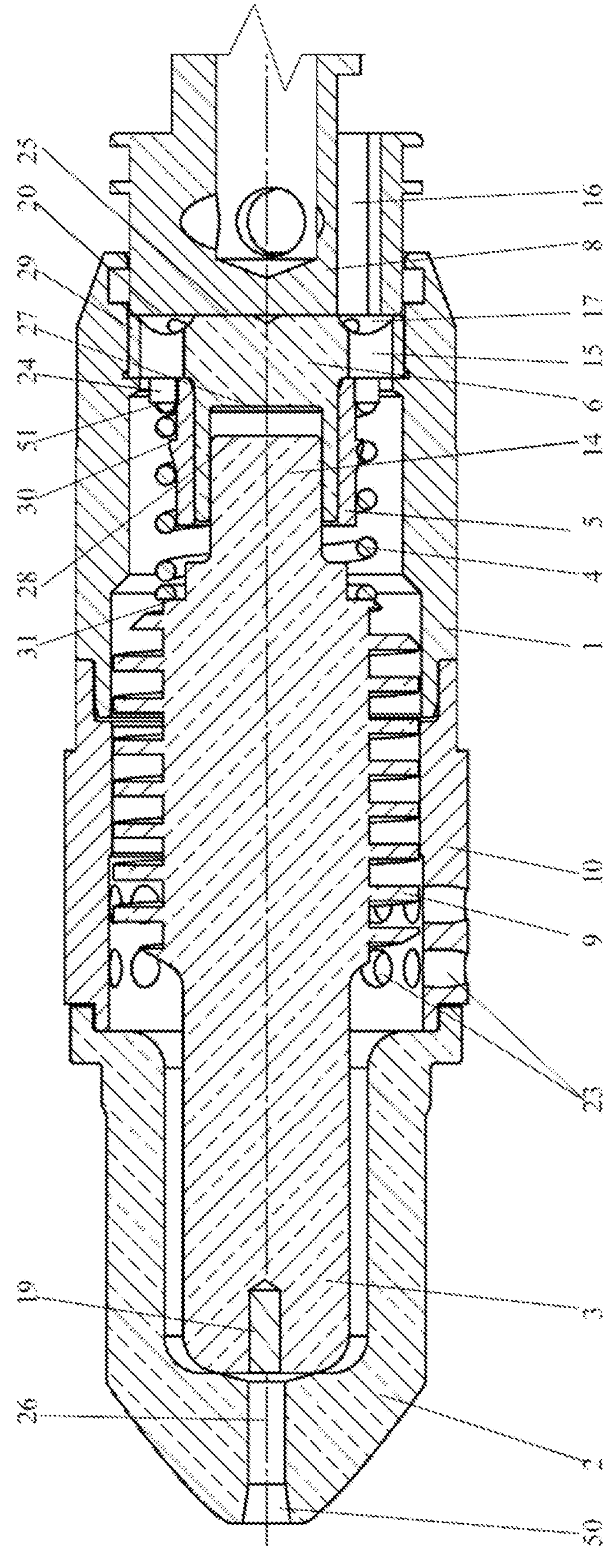
FIG. 1 shows a longitudinal sectional view of a first exemplifying embodiment of the assembly for a contact start plasma arc torch, the assembly including an electrode, a nozzle and a swirl ring.

The assembly for a contact start plasma arc torch depicted in FIG. 1 comprises a nozzle 2, the distal end of which includes a through outlet opening 50 for the exit of plasma arc and plasma gas. Distal end of a swirl ring 10 is connected to the proximal end of the nozzle 2, proximal end of the swirl ring 10 being connected to a holder 1, which is attached by its proximal end to a power supply component 8 for electric energy supply.

The nozzle 2, the swirl ring 10 and the holder 1 form a common cavity, in which the electrode 3 is slidably arranged along a common longitudinal axis 26 of the nozzle 2, swirl ring 10, holder 1 and the electrode 3.

The holder 1 and the swirl ring 10 have a tubular shape, wherein the wall of the swirl ring 10 includes feeding openings 23 for entry of the plasma gas into said common cavity.

The holder 1 is made of an insulating material and its distal end is adapted to be connected to the swirl ring 10.

The electrode 3 comprises a distal end portion, a middle portion and a proximal end portion 14. The distal end portion includes an emissive element 19, made for example of hafnium. The middle portion of the electrode 3 is provided with an external rib 9, which extends helically along external lateral wall of the electrode. The external circumferential wall of the rib 9 abuts internal circumferential walls of the swirl ring 10, eventually internal circumferential walls of the holder 1 with a clearance, thereby delimiting the movement of the electrode 3 along its longitudinal axis 26.

There is a contact element 6 arranged in the holder 1, wherein a proximal contact surface 25 of the contact element is adapted for abutting against a distal contact surface 20 of the power supply component 8. Further, the contact element 6 comprises a cavity at the opposite side with respect to the proximal contact surface 25, wherein the proximal end portion 14 of the electrode is insertable into said cavity, the outer side walls of the proximal end portion 14 of the electrode being in contact with the inner walls of the cavity of the contact element 6. More specifically, the outer side walls of the proximal end portion 14 of the electrode 3 are complementary in shape to the inner side walls of the cavity of the contact element, namely with a clearance within the range of 0.02 to 0.1 mm. Preferably, the outer side walls of the proximal end portion 14 of the electrode and the inner side walls of the cavity of the contact element 6 are tubular or cylindrical, but they may have other cross-section shapes, as long as they are in surface to surface area contact and allow mutual movement along the axis 26.

Said clearance between the external lateral wall of the proximal end portion 14 of the electrode 3 and the inner side walls of the cavity of the contact element 6 is smaller than the clearance between the external circumferential wall of the rib 9 of the electrode 3 and the internal wall of the swirl ring 10 or holder 1.

Even in the frontal position of the electrode 3, wherein the distal end of the electrode 3 is in contact with the nozzle 2, the proximal end portion 14 extends at least partially into the cavity of the contact element 6.

The contact element 6 is made of an electrically conductive material and an insulation element 5 is arranged thereon, the insulation element 5 having a supporting surface 51 for supporting the proximal end of the spring 4.

In addition, the contact element 6 comprises a supporting flange 29. The supporting flange 29 includes through openings 15, their inlets being located at the distal surface of the supporting flange 29, i.e. at the side facing the spring 4 and the insulation element 5, and the outlets being located on the proximal surface of the supporting flange 29, i.e. on the side facing away from the spring 4 and the insulation element 5, wherein these outlets of the through openings 15 are mutually connected by a distribution groove 17 in the proximal contact surface 25 of the contact element 6. The distribution groove 17 can be for example of an annular shape.

The electrode 3 has a supporting surface 31 which faces the supporting surface 51 of the insulation element 5, wherein the supporting surfaces 31, 51 are arranged with mutual spacing. A spring 4 for pushing the electrode 3 in the direction away from the power supply component 8 to the outlet opening of the nozzle 2, thus in the distal direction, is arranged between the supporting surface 31 of the electrode 3 and the supporting surface 51 of the insulation element 5.

In the depicted embodiments, the insulation element 5 is tubular and is provided at its proximal end with a supporting projection 24 in the form of a flange or a collar, which rests with its proximal surface on the supporting flange 29 of the contact element 6 and its distal surface forms the supporting surface 51 of the insulation element 5. In the depicted embodiments, the supporting projection 24 is provided with cut-outs 52 for the passage of the plasma gas, wherein these cut-outs 52 at least partially align with the through openings 15 in the contact element 6.

According to an alternative embodiment, there is a plurality of supporting projections 24. The tubular wall of the insulation element 5 extends along the external side of the wall of the cavity of the contact element 6, thereby preventing an electrically conductive contact of the spring 4 with the outer side wall of the cavity of the contact element 6.

In addition, the insulation element 5 is provided with a stop 30 in the form of an annular rib for attaching the spring 4 to the insulation element 5 by setting a proximal portion of the spring 4 in a position between the stop 30 and the supporting projections 24. The stop 30 on the insulation element 5 can be alternatively in the form of a set of projections etc.

The angle between the lateral surface of the stop 30 and the lateral surface of the insulation element 5 is on the side facing the supporting surface 51 of the insulation element 5 bigger than on the side facing away from the supporting surface 51 of the insulation element 5. This facilitates the mounting or attaching the spring 4 to the insulation element 5 and at the same time lowers the risk of sliding of the spring 4 off the insulation element 5 during assembling or disassembling of the assembly.

The assembly of FIG. 1 operates as follows: The electrode 3 is arranged in the frontal position due to the action of the spring 4, thus its distal end is in contact with the nozzle 2. Electrical current is applied to the power supply component 8 for the initiation of the pilot arc mode. The electric current passes from the power supply component 8 to the contact element 6 through the proximal contact surface 25 of the contact element 6 and from the contact element 6 to the electrode 3 through the inner side walls of the cavity of the contact element 6 and the lateral walls of the proximal end portion 14 of the electrode 3.

Gas is introduced into the cavity within the nozzle 2 and the swirl ring 10 via inlet openings 23 in the swirl ring 10, thereby increasing the pressure in this cavity and causing the electrode 3 to move from the frontal position to the rear position, during which movement the distal end portion of the electrode 3 moves away from the nozzle 2 and the electric current continues to pass from the contact element 6 to the electrode 3 via the inner side walls of the contact element 6 and the lateral walls of the proximal end portion 14 of the electrode 3. At the same time a pilot arc is created between the nozzle 2 and the electrode 3.

After attaining the rear position of the electrode 3, the proximal contact surface 28 of the proximal end portion 14 abuts against the distal contact surface 27 of the contact element 6, which faces the proximal contact surface 28. Subsequently the arc can be transferred from the electrode 3 towards the processed material, the torch thus being switched to the transferred arc mode, i.e. to the work mode.

Also, a part of the gas introduced into the cavity in which the electrode 3 is arranged is carried away from the assembly through the opening 50 in the nozzle 2, another part being carried away through the cut-outs 52 in the insulation element 5, the through openings 15 in the contact element 6 and the exit openings 16 in the power supply component 8.

Gases as for example air, $N_2$, Ar, or a mixture of $N_2$ and $H_2$ can be used.

The spring 4 is always insulated form the contact element 6 by means of the insulation element 5 and no current passes through the spring 4 in any one of the modes.

The second embodiment, depicted on FIGS. 2 to 4, again comprises the holder 1 having a tubular shape, which is by its proximal end attached to the distal end of the power supply component 8 intended for supply of the electric energy, e.g. using a conventional type of attachment used for plasma arc torches.

The distal end of the power supply component 8 comprises a distal contact surface 20 for contact with the contact element 6 and with the proximal contact surface 28 of the electrode 3 as well.

Figure 2:
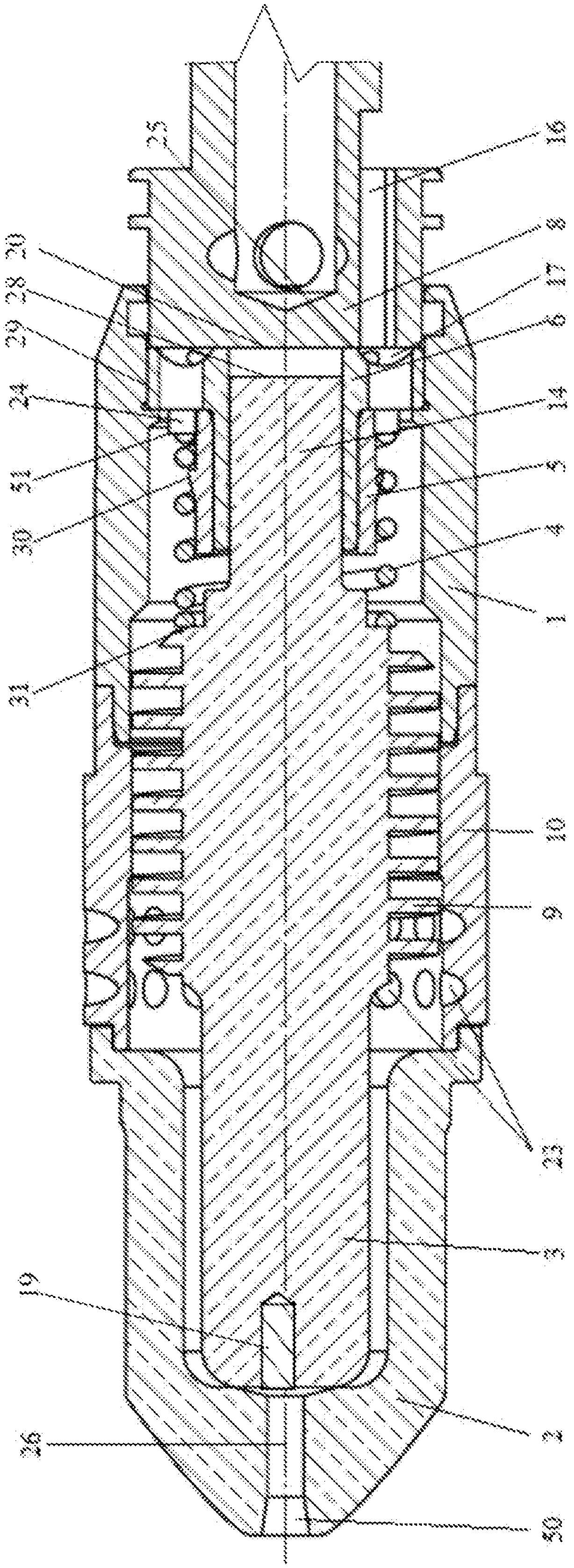
FIG. 2 shows a longitudinal sectional view of a second exemplifying embodiment of the assembly, the electrode being in the frontal position.
Figure 3:
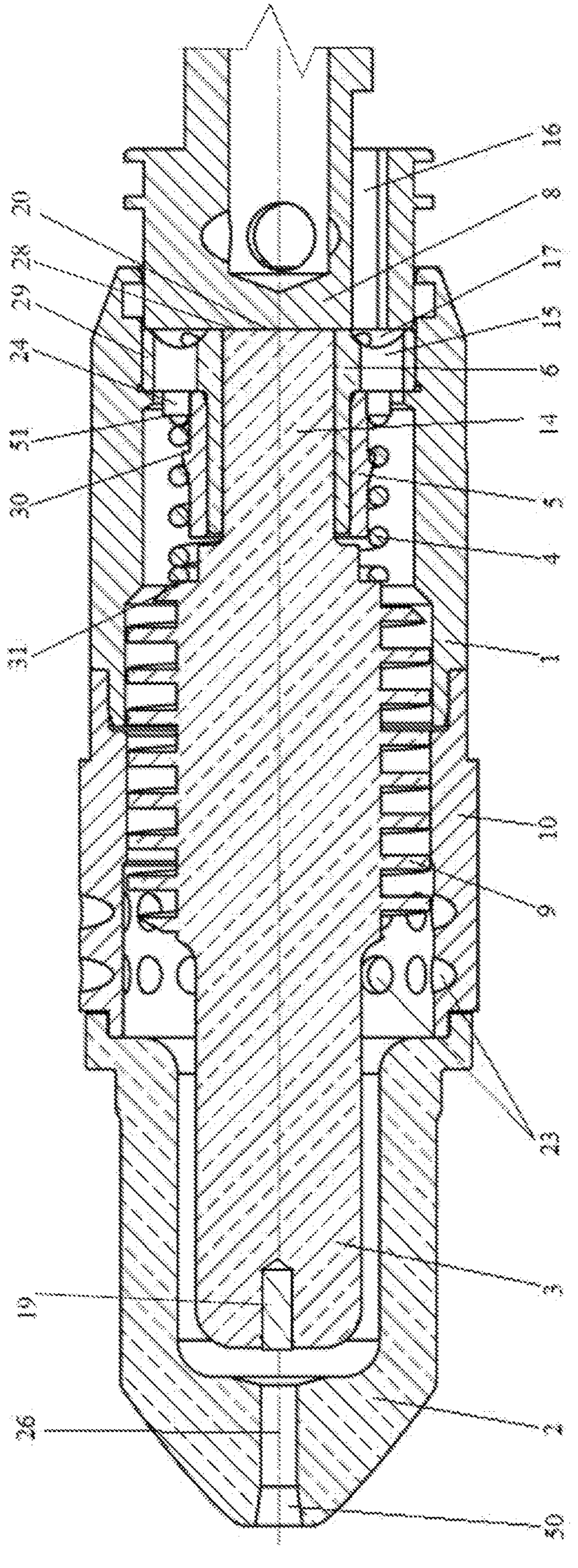
FIG. 3 shows a longitudinal sectional view of the second exemplifying embodiment of the assembly, the electrode being in the rear position.
Figure 4:
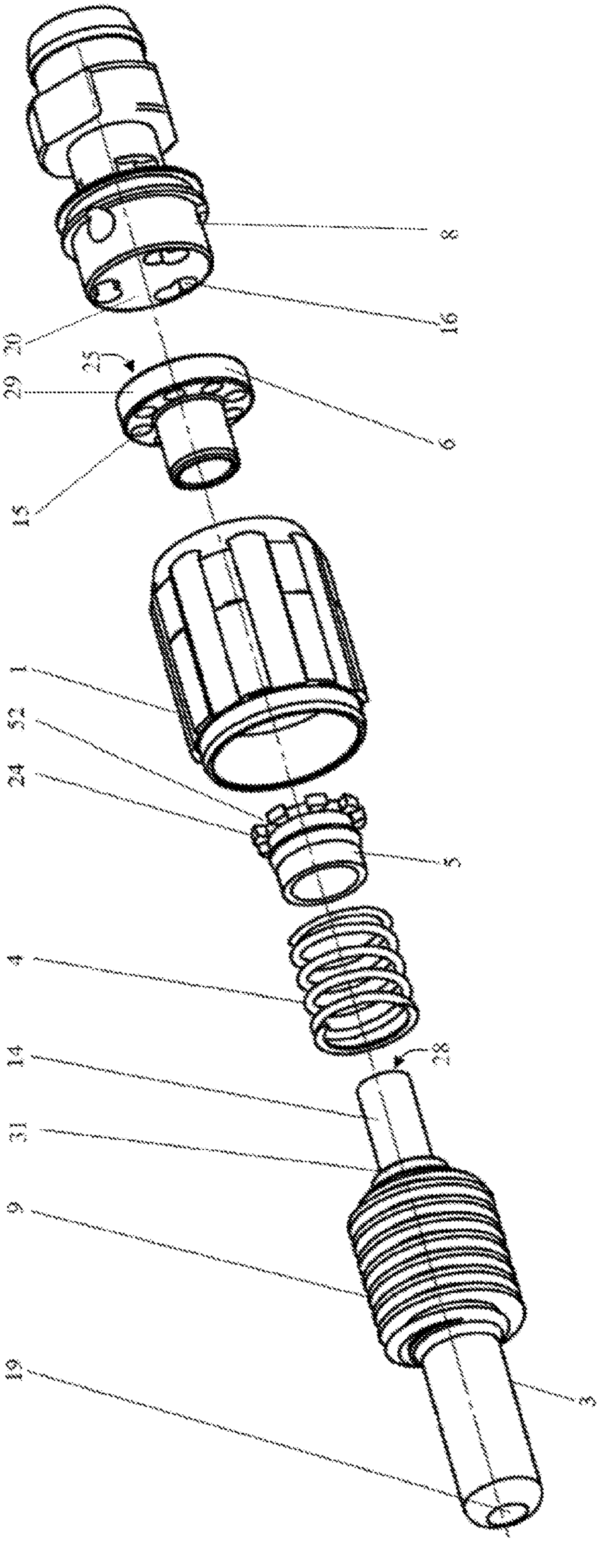
FIG. 4 depicts the assembly of FIGS. 2 a 3 in an exploded view.

The contact element 6 is made of an electrically conductive material and in the embodiment of FIGS. 2 to 4 includes a through cavity, into which the proximal end portion 14 of the electrode 3 is inserted. The embodiment depicted in FIGS. 2 to 4 therefore differs from the embodiment depicted in FIG. 1 in that the cavity in the contact element 6 is through passage, meaning that in the position, in which the end portion 14 of the electrode 3 is maximally inserted into the cavity of the contact element 6, thus in the rear position of the electrode 3, the proximal contact surface 28 of the proximal end portion 14 of the electrode 3 abuts against the distal contact surface 20 of the power supply component 8 (and transfer of current from the power supply component 8 to the electrode 3 happens primarily directly, i.e. through contact between the distal contact surface 20 of the power supply component and the proximal contact surface 28 of the electrode 3).

In the forward, i.e. frontal position of the electrode 3, the proximal contact surface 28 of the electrode 3 is arranged spaced from the distal contact surface 20 of the power supply component 8, while the distal contact surface of the electrode 3 is in contact with the internal surface of the nozzle 2.

Similarly to the embodiment of FIG. 1, also the embodiments of FIGS. 2-4 include a clearance between the inner side walls of the cavity of the contact element 6 and the lateral walls of the proximal end portion 14 of the electrode 3 in the range of 0.02 to 0.1 mm.

Such a clearance ensures, that the electrode 3 can move from the frontal position to the rear position, or more precisely that the proximal end portion 14 of the electrode 3 can move in the cavity of the contact element 6 and the lateral walls of the end portion 14 and of the contact element 6 are in contact for transfer of electric current when the electrode 3 is in the frontal position and when it is moving between the frontal position and the rear position.

Additionally, it is possible to see in FIGS. 1-3, a path of a part of the gas from the cavity of the nozzle 2, namely along the helical rib 9 at the electrode 3, through cut-outs in the supporting projection 24 of the insulation element 5, through the pass-through openings 15 in the supporting flange 29 of the contact element 6 and through the exit openings 16 in the power supply component 8.

The cut-outs in the supporting projection 24 of the insulation element 5 can be omitted for example when the supporting projection 24 has a cross-section sufficiently small to allow entrance of gas into the through openings 15 in the contact element 6 or, instead of the supporting projection 24, a set of radial projections etc. can be formed for supporting the spring.

The insulation element 5 is preferably made of a material that provides electrical insulation and a good thermal resistance, e.g. of a thermally resistant plastic, most preferably resistant to temperatures up to at least 150° C.

In yet another non-depicted embodiment, the insulation element 5 can be in the form of an insulation coating, or eventually an insulation layer on a part of the external surface of the contact element 6, specifically on the supporting surface of the contact element 6 and on the outer side of the side walls of the internal cavity of the contact element 6. In that case the insulation element 5 can be made of a suitable plastic material which provides electrical insulation and a good thermal resistance.

Although various embodiments have been described, it is clear that a person skilled in the art may easily find further possible alternatives to the described embodiments. The scope of the invention is thus not limited only to these exemplifying embodiments, but it is rather defined by the appended claims.

The invention claimed is:

1. Assembly for a plasma arc torch comprising:

an electrical contact element, having a proximal contact surface for contact with a power supply component and a cavity with inner side walls for contact with side walls of a proximal end portion of an electrode, and a spring for pushing the electrode away from the electrical contact element, and an insulation element arranged on the electrical contact element and adapted to prevent transfer of electrical current form the electrical contact element to the spring.

2. Assembly according to claim 1, characterized in that it further comprises an electrode, wherein a proximal end portion of the electrode is insertable into the cavity of the electrical contact element, wherein side walls of the proximal end portion of the electrode are in contact with the inner side walls of the cavity of the electrical contact element.

3. The assembly according to claim 2, characterized in that the side walls of the proximal end portion of the electrode have a shape complementary to the inner side walls of the cavity of the electrical contact element, wherein clearance between the side walls of the proximal end portion of the electrode and the inner side walls of the cavity of the electrical contact element is 0.02 to 0.1 mm.

4. The assembly according to claim 2, characterized in that it further comprises:

a nozzle, a holder having a tubular shape, and a swirl ring having a tubular shape and feeding openings in its lateral wall, wherein the distal portion of the swirl ring is attached to the nozzle (2) and the proximal portion of the swirl ring is attached to the holder, wherein the nozzle, the swirl ring and the holder are arranged coaxially and form a common cavity, in which the electrode is slidably arranged along a common axis, wherein the electrode is on its external lateral side provided with a rib, which extends helically and with clearance along the internal side of the swirl ring and/or the holder.

5. The assembly according to claim 4, characterized in that the clearance between the side walls of the proximal end portion of the electrode and the side walls of the cavity of the electrical contact element is smaller than the clearance between the rib of the electrode and the internal wall of the swirl ring and the holder.

6. The assembly according to claim 1, characterized in that the electrical contact element has a tubular portion, which includes said cavity, wherein the insulation element forms a sleeve on the tubular portion of the contact element.

7. The assembly according to claim 6, characterized in that the contact element is provided with a supporting flange, against which the insulation element abuts.

8. The assembly according to claim 1, characterized in that the insulation element has at its proximal end at least one supporting projection, which includes a supporting surface for supporting proximal end of the spring.

9. The assembly according to claim 8, characterized in that the insulation element is at its external side provided with a stop for fixing the proximal end of the spring between the stop and the supporting surface of the insulation element.

10. Method of operation of a plasma arc torch comprising following steps:

a) an electrode is arranged in a cavity of a plasma arc torch slidably in its axial direction, wherein the electrode is biased by means of a spring into a frontal position, in which its distal end is in contact with a nozzle, b) electric current is applied to a power supply component, the electrical current further being conducted via a contact element to the electrode, c) thereafter, gas is introduced into the cavity of the plasma arc torch, the gas pushing the electrode in its rear position against the force of the spring, wherein a pilot arc is established between the electrode and the nozzle, d) thereafter, the arc is transferred to a workpiece to be processed, characterized in that:

in step a) an insulation element is arranged on the contact element for preventing passage of electrical current from the contact element to the electrode via the spring, wherein the electrode is arranged such that its proximal end portion extends into the cavity of the contact element, and in the steps b) and c) the electrical current passes from the contact element via a contact between the inner side wall of the cavity of the contact element and the outer side wall of the proximal end portion of the electrode, at least until rear position of the electrode is attained.

* * * * *